May 26, 1931.  J. SERVAAS  1,806,828
KITCHEN UTENSIL
Filed June 19, 1929

Inventor
JAN SERVAAS
By His Attorney
John J. Lynch

Patented May 26, 1931

1,806,828

UNITED STATES PATENT OFFICE

JAN SERVAAS, OF BROOKLYN, NEW YORK

KITCHEN UTENSIL

Application filed June 19, 1929. Serial No. 372,184.

This invention relates to combination kitchen utensils and in particular to one in which is incorporated a jar cover opener, a cork screw, an ice pick and can opener.

A particular object of my invention is to provide a household utensil in which are employed clamping jaws for the removal of a jar or bottle top, the jaws being adjustable toward and away from each other in order that jar caps of various sizes may be operated upon.

I am aware that bottle openers of one form or another have been conceived but the use of an internally serrated arm in combination with an adjustable arm to fit various sizes of caps so that the bottle opener will be universal in its operation, I believe to be novel.

A still further object of my invention is to provide a number of tools in connection with the handle of the jar cap remover which are normally out of the way but which may be instantly placed in position for use and further, to provide a kitchen utensil which embodies all of the ordinary kitchen tools so that the time of the houswife is saved and the tools are all embodied in a single implement.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Figure 1:
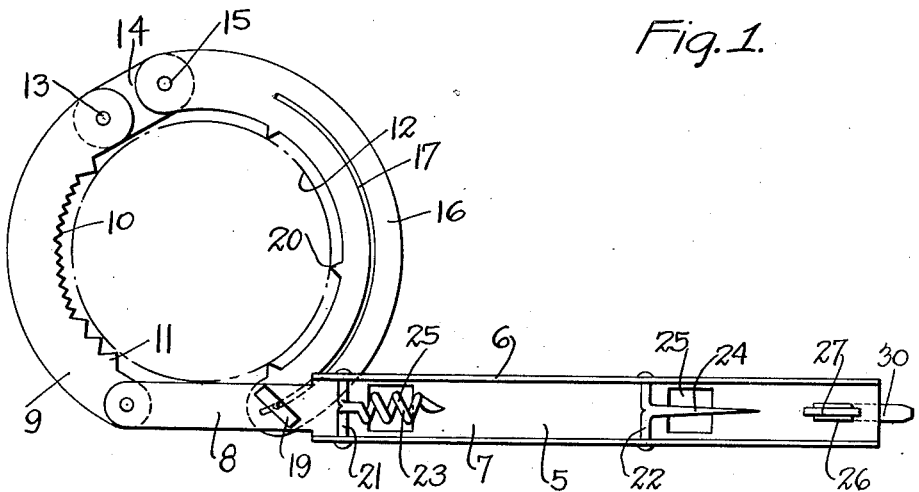
Figure 1 is a top plan view of a kitchen utensil constructed in accordance with my invention, the same illustrating the position of the cork screw, ice pick and can opener.
Figure 2:
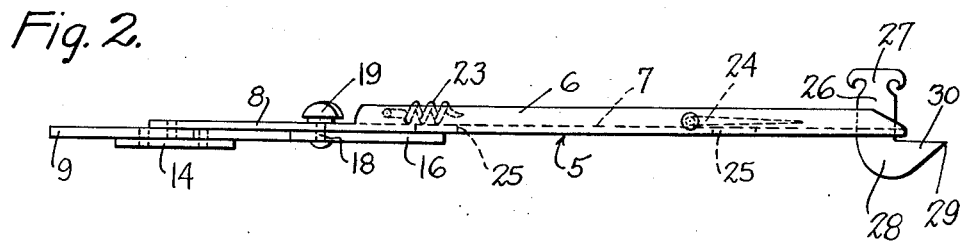
Figure 2 is a view in side elevation of the utensil illustrated in Figure 1.

Referring to the drawings in detail, 5 indicates a channel handle which is of elongated nature and is shaped to provide the side portions 6 which terminate at a point adjacent the forward end of the handle at which point the bottom 7 of the handle is slightly reduced in thickness to form a handle extension 8. To the extreme outer end of the handle 8, there is pivoted the jaw 9, the inner edge of which is provided with the small serrations 10 and the large teeth 11 which are arranged to contact with and hold the lid or cover of a jar indicated in outline and by the numeral 12. When said jar cover is to be unscrewed or threaded on to a receptacle, this jaw 9 is pivoted as at 13 to a connecting link 14, the link, in turn, being pivoted as at 15 to the extreme outer end of an adjustable clamp arm 16. This clamp arm is provided with a central, longitudinally extending slot through which passes the shank of an adjusting screw 18. This screw is arranged to receive the nut 19 which secures the adjustable clamp arm 16 in any adjusted position against the handle extension 8. The inner edge of the adjustable clamp arm 16 is also provided with teeth 20 which are arranged to engage the periphery of a jar or bottle cover to be operated upon. The sides 6 of the handle 5 in addition to imparting strength and rigidity to the handle, also serve as journals for the ends of the cross bars 21 and 22, the former of which is shaped to provide the cross screw 23 while the latter is extended and sharpened to provide an ice pick 24.

The bottom of the handle 7 is provided with suitable openings 25 which are each positioned beneath the cork screw and ice pick respectively so that the finger may be passed through these openings to move either of these implements referred to to their working position. The end of the handle has passing therethrough the shank 26, whose upper end is arranged to provide the hook 27 which constitutes a bottle cap remover, the lower end of the shank below the bottom 7 of the handle 5 constituting the can opener 28 whose piercing point 29 and cutting edge 30 are operable in the usual manner to cut the top out of a tin can.

Figure 3:
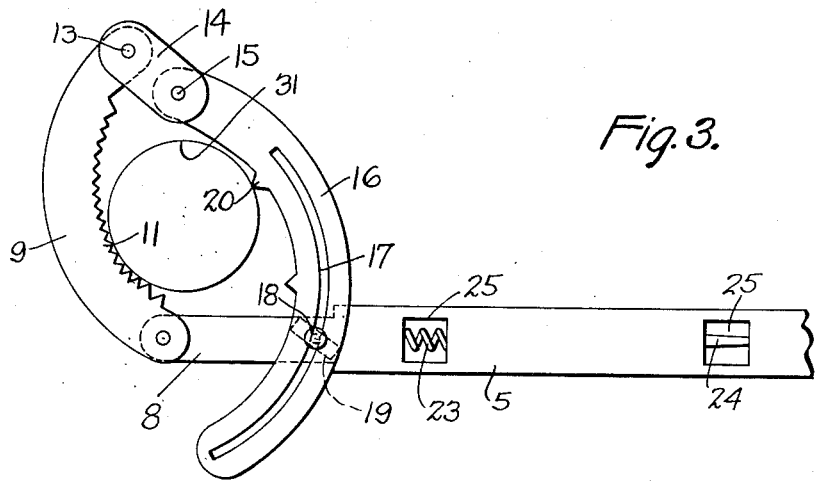
Figure 3 is a bottom plan view of a kitchen utensil similar to the one illustrated in Figure 1 showing the adjustable nature of one of the clamp arms whereby a jar cap of smaller diameter may be effectively removed.

It is quite evident from inspection of Figure 3 that when the arm 16 is permitted to move by reason of the loosening of the nut 19, a smaller size cover 31 may be engaged by the teeth 20 and serrations 11. It will be noted that the movement of the adjustable arm 16 is accommodated through the medium of the link 14 which permits the adjustable clamp arm 16 to move toward the jaw 9 in order to accommodate various sizes of jar covers which are to be removed or replaced.

It is evident, therefore, that I have provided a combination kitchen utensil having a jar cover removing end which is adjustable to accommodate itself to jar covers of various sizes and one which can be readily manipulated to fit and be adjusted to the proper size.

It is also evident that I have provided a combination kitchen utensil in which is incorporated a cork screw, ice pick, can opener and bottle cap remover, all of the implements being congregated for quick usage and effective operation.

While I have illustrated and described my invention with some degree of particularity, I realize that in practice various alterations therein may be made without departing from the spirit of the invention or the scope of the appended claims.

What I claim is:—

A utensil of the character referred to comprising a channeled handle having an extended unchanneled portion, a jaw pivoted to said extended portion, relatively large and small serrations on one edge of said jaw, a slotted adjustable clamp arm having a plurality of spaced apart tongues constituting teeth on one edge thereof, a relatively short link connecting one end of the clamp arm and one end of the jaw, and an adjusting screw in the extension passing through said slot for securing the clamp arm in any adjusted position.

In testimony whereof, I have signed my name to this specification, this 29th day of May, 1929.

JAN SERVAAS. [L. S.]